United States Patent [19]
Herzl

[11] 3,709,034
[45] Jan. 9, 1973

[54] SIGNAL CONDITIONER FOR RECOVERING DOMINANT SIGNALS FROM SWIRL-TYPE METERS

[75] Inventor: Peter J. Herzl, Morrisville, Pa.

[73] Assignee: Fischer & Porter Company, Warminster, Pa.

[22] Filed: Feb. 2, 1971

[21] Appl. No.: 111,913

[52] U.S. Cl.................73/194 B, 307/233, 324/77 B, 324/78 R, 328/140
[51] Int. Cl.................................................G01s 1/00
[58] Field of Search.....73/194 B; 307/233, 235, 295; 324/78 R, 77 B; 328/140, 165

[56] References Cited

UNITED STATES PATENTS

| | | | |
|---|---|---|---|
| 3,522,449 | 8/1970 | McMurtrie | 307/235 |
| 3,433,979 | 3/1969 | Hubbard | 307/235 |

Primary Examiner—James J. Gill
Assistant Examiner—Herbert Goldstein
Attorney—Michael Ebert

[57] ABSTRACT

A signal conditioner adapted to extract the dominant frequency from the composite output signal of a swirl or vortex type flowmeter and to exclude low and high frequency noise components whereby by measuring only the dominant frequency, one obtains an accurate reading of fluid flow quantity. The signal conditioner includes a square-wave-generating trigger to generate the measuring frequency, which trigger undergoes a change in output state only when the amplitude of the signal applied thereto rises above a predetermined high level and reverts to its original output state when the amplitude of the applied signal falls below a predetermined lower level, no change in state occurring with respect to amplitude fluctuations lying within the window defined by the two levels. The composite signal is applied to the trigger through an automatic gain control circuit whose attenuation is automatically changed as a function of frequency whereby the amplitude of the composite signal applied to the trigger is greatest when the dominant frequency thereof is at the high end of the operating range, thereby effectively broadening the window for low operating frequencies and narrowing the window for high operating frequencies to effect low-frequency noise rejection at high operating frequencies and high-frequency noise rejection at low operating frequencies.

8 Claims, 8 Drawing Figures

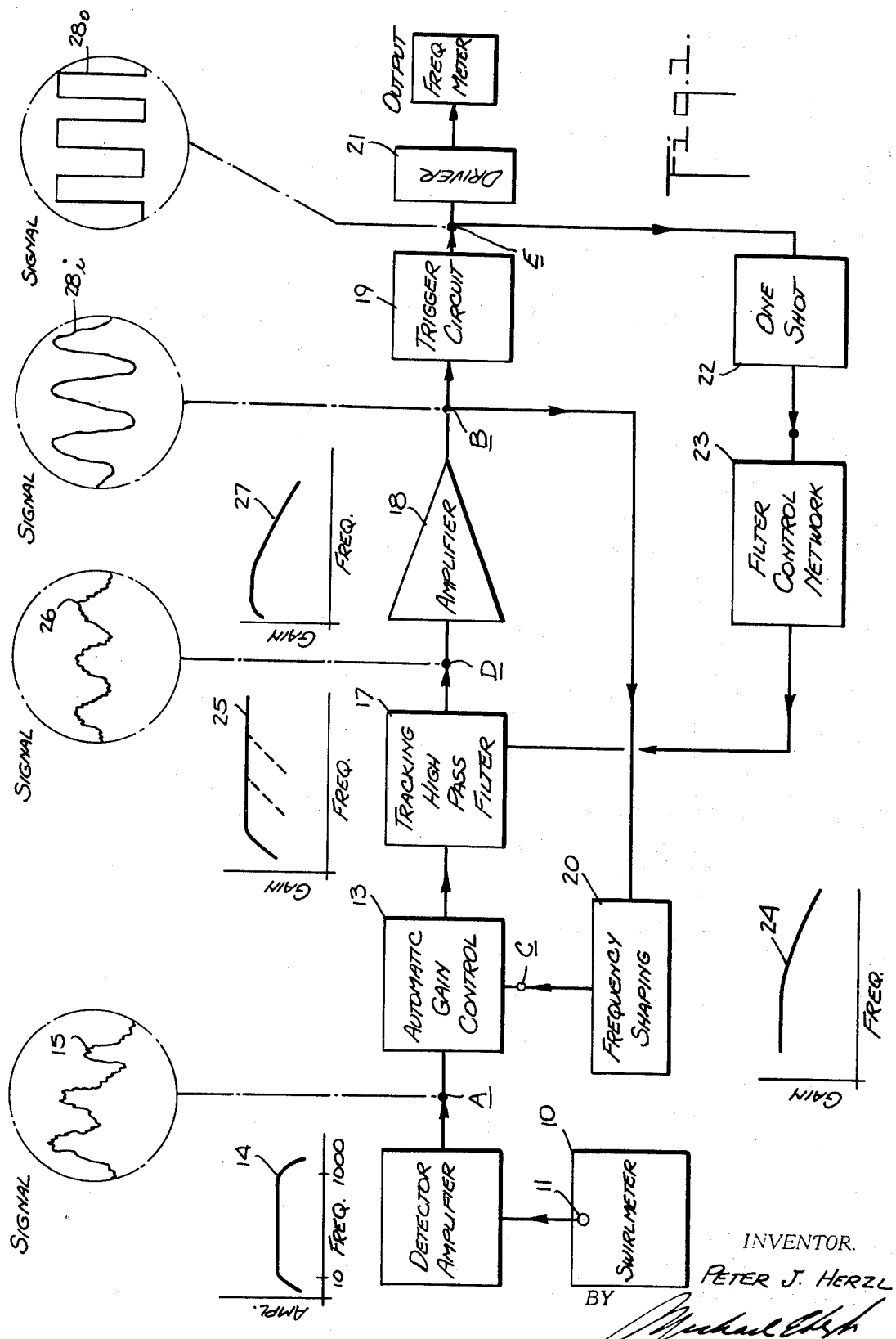

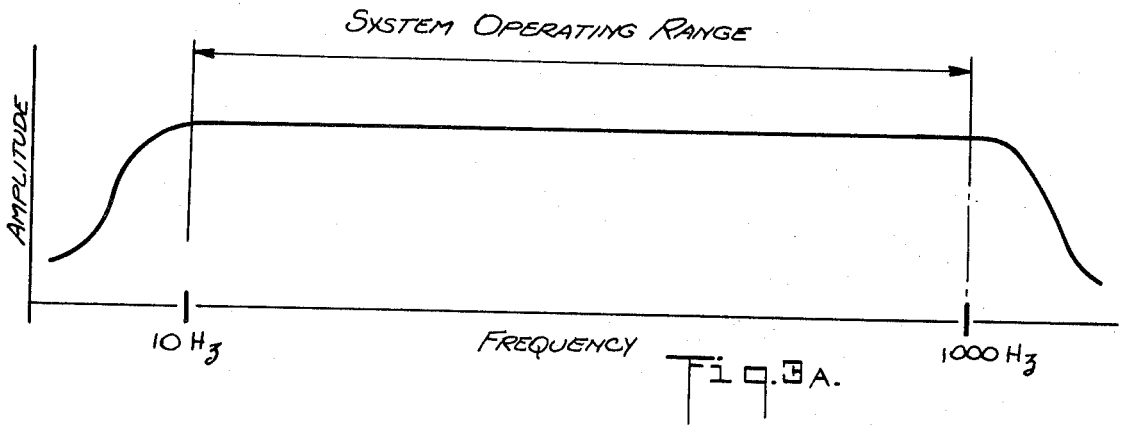
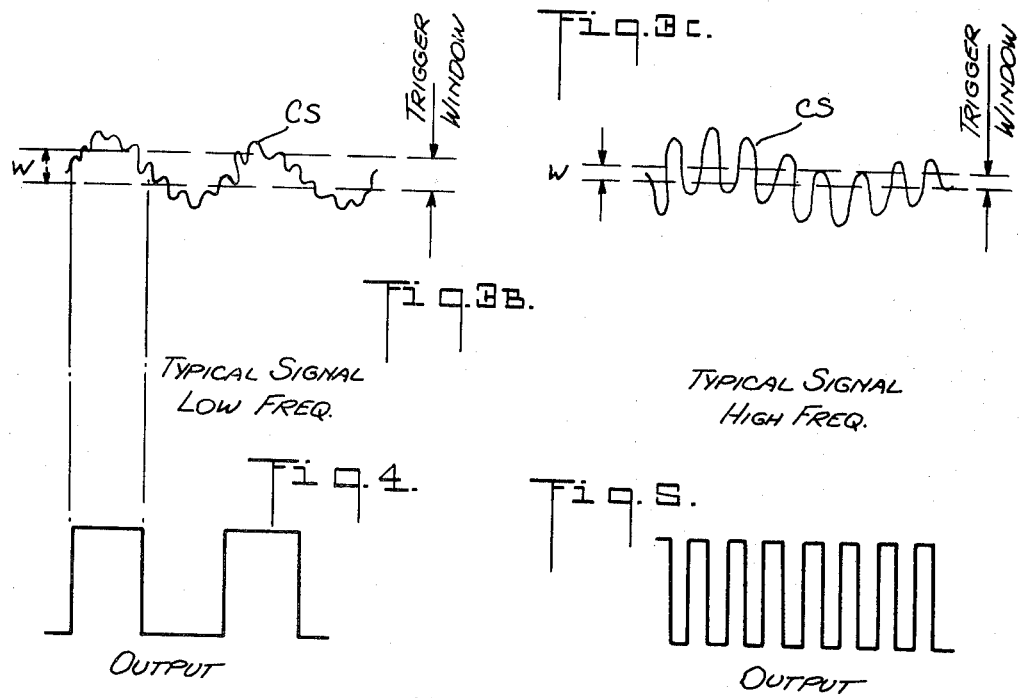
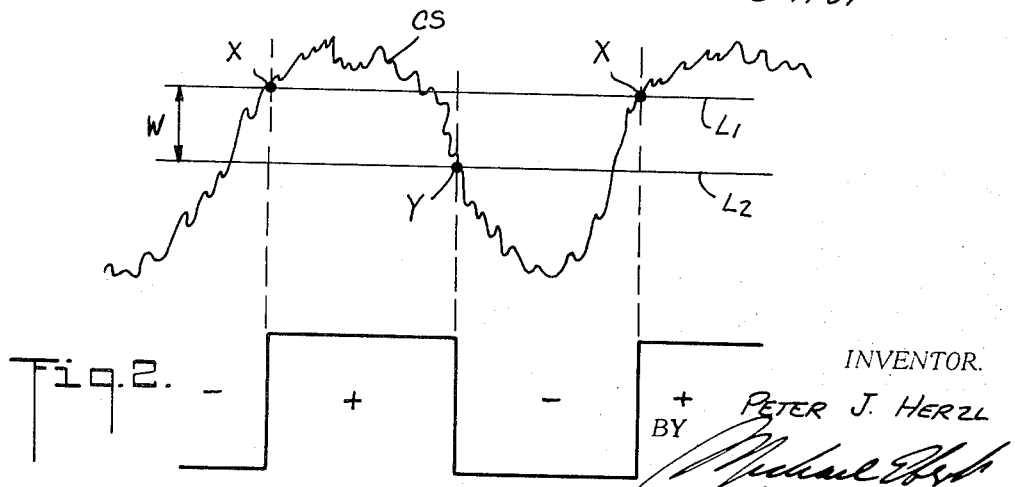
INVENTOR.
PETER J. HERZL
BY
ATTORNEY

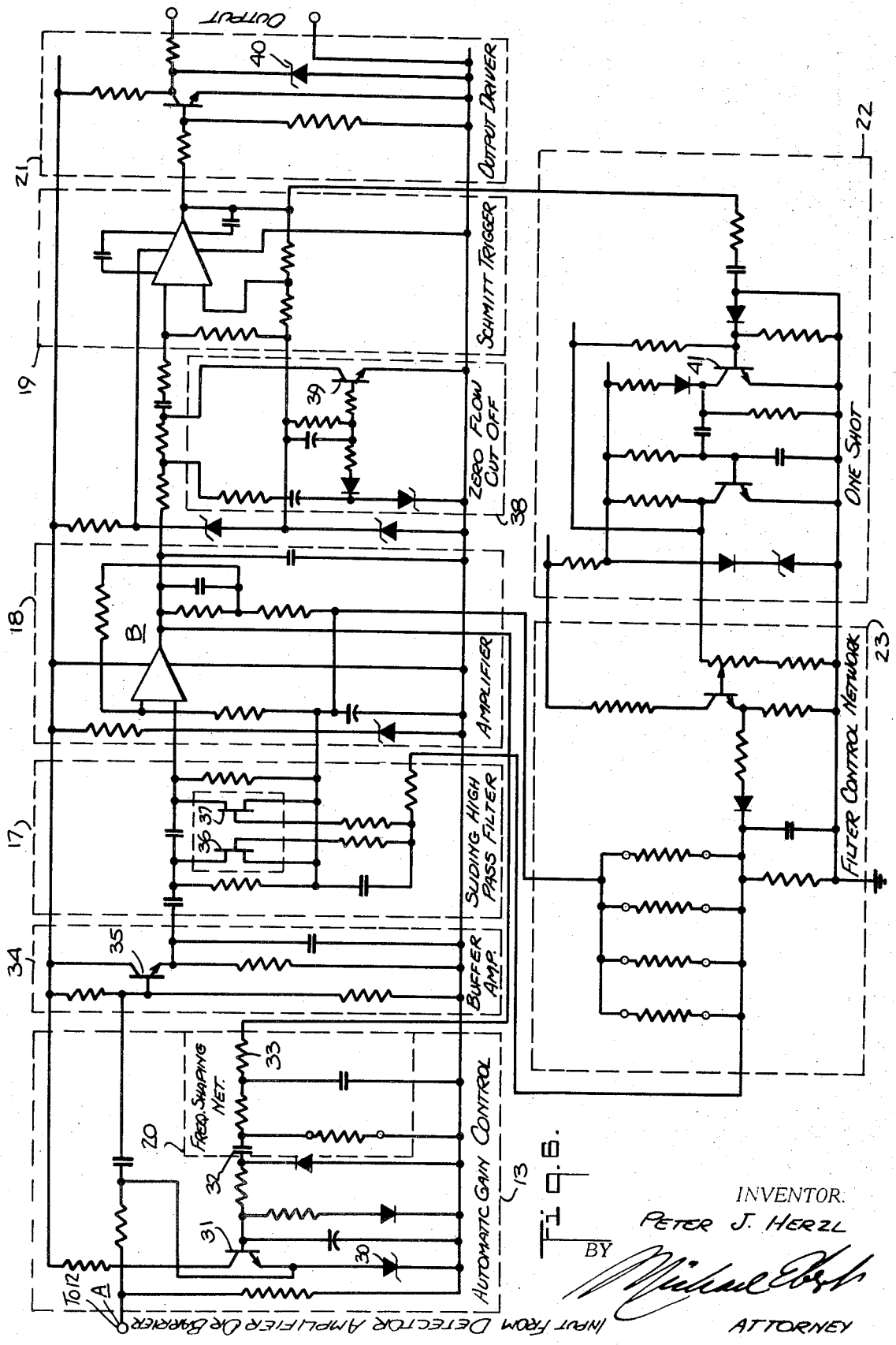

SIGNAL CONDITIONER FOR RECOVERING DOMINANT SIGNALS FROM SWIRL-TYPE METERS

BACKGROUND OF THE INVENTION

This invention relates generally to swirl-type flowmeters, and in particular to a signal conditioner adapted to extract the dominant signal from the output of a swirl-type flowmeter and to exclude noise and lesser signal components.

A new type of volumetric flowmeter is disclosed in the article of Rodely, et al, entitled "A Digital Flowmeter Without Moving Parts," published in 1965 by the American Society of Mechanical Engineers (8 April 1965 — WA/FM6). This flowmeter, which is of the swirl type, is now known commercially under the trademark "Swirlmeter." Meters of this type are also described in U.S. Pat. Nos. 3,279,251; 3,314,289; and U.S. Pat. No. Re.26,410, among others.

In a Swirlmeter, a homogeneous fluid whose flow rate is to be measured is forced to assume a swirl component by converting pressure energy into kinetic energy. This is accomplished by feeding the fluid into the inlet section of a flow tube having a fixed set of swirl blades therein imparting a swirling motion to the fluid passing therethrough. Downstream of the swirl blades in the tube is a Venturi section which first constricts and then expands the flow passage to transform the swirling motion into precessional movement in the expanding region of the Venturi section. Precession takes place about the central axis of the flow tube at a discrete frequency that is a function of the volumetric flow rate. De-swirl blades in the outlet section of the flow tube serve to straighten out the fluid leaving the meter. Cyclic variations in local fluid velocity, occurring by reason of precession, are detected to provide electrical pulses whose frequency is measured to provide an indication of flow rate.

In a commercial form of Swirlmeter manufactured by Fischer & Porter Company of Warminster, Pennsylvania, the assignee herein, the vortex precession in the meter is sensed by a probe having a thermistor at its tip which is caused to operate in its self-heat region by applying a constant current across it, heating the thermistor to a temperature above that of the passing fluid. Because of the periodic cooling action produced by the vortex precession, the change in thermistor resistance produces concurrent voltage variations.

These voltage variations are detected, amplified and shaped by a detector-amplifier associated with the thermistor.

Included in the detector-amplifier is a frequency-compensating amplifier that compensates for the frequency response of the thermistor. Inherently, the thermistor output is highest at low frequencies and decreases with increasing frequency. The frequency-compensating amplifier adjusts for the amplitude roll-off characteristic of the thermistor. This Swirlmeter is described in the Instruction Bulletin for Series 10S1000 Swirlmeter, published by Fischer & Porter Co.

Though the variable of interest in the Swirlmeter system is the flow rate of the fluid being measured, the system responds to more than one variable. The frequencies reflecting the other variables are superimposed on the fundamental system frequency to produce a composite signal. These frequency components may be derived from blower or compressor pulsations, or hydraulic noise. In addition, the amplitude of the process variable signal from the detector-amplifier may vary as a result of still other variables. Some of these variables are related to frequency and may be compensated for by having different levels of amplifier gain at different frequencies, whereas other variables unrelated to frequency result in amplitude variations. In the case of a Swirlmeter, such non-related variables are temperature, pressure, gas density, meter size, etc. The irrelevant frequencies in the Swirlmeter output, unless discriminated against, are a primary source of measurement error.

In order to separate the dominant frequency representing flow rate from all noise and irrelevant frequencies found in the composite process variable signal, the Fischer & Porter Swirlmeter described in the above-mentioned Instruction Bulletin makes use of a signal conditioner of the type described in the McMurtrie U.S. Pat. No. 3,522,449, wherein the process variable signal is applied to a three-band filter network. Each band of this network is designed to pass only those signals within a particular frequency span while sharply attenuating those frequencies outside its specific range. The output signal from each of the three networks is introduced simultaneously to one of three separate amplifier channels.

These channels (low, middle and high) include a minimum signal detector functioning to enable signal transmission from only one of the three channels at any one time, whereby the signal conditioner will automatically select the frequency band containing the dominant signal voltage related to flow rate and will direct the signal within the band to its own output.

Though the signal conditioner in present use functions effectively, it is relatively complex and expensive and adds substantially to the over-all cost of the Swirlmeter system.

SUMMARY OF THE INVENTION

In view of the foregoing, it is the main object of this invention to provide a signal conditioner for use in conjunction with a vortex-type meter for automatically extracting the dominant signal from a composite signal within a given frequency range and for rejecting all other components.

Also an object of the invention is to provide a relatively simple and inexpensive signal conditioner to extract the dominant signal from a composite Swirlmeter signal and to generate a periodic square-wave whose measurement affords an accurate index to flow rate.

Though the invention will be described in conjunction with a Swirlmeter, it is also usable with other systems requiring discrimination between a dominant frequency and other, non-relevant frequencies present in a composite output signal, such as in a vortex-type flowmeter of the type described in the co-pending application of Burgess, Ser. No. 855,153, filed Sept. 21, 1969, now U.S. Pat. No. 3,589,185.

Briefly stated, these objects are attained in a signal conditioner including a trigger which undergoes a change in output state only when the amplitude of signal applied thereto exceeds a predetermined high level and reverts to an original output state when the amplitude falls below a predetermined lower level, the trigger being insensitive to amplitude changes lying within the window defined by the two levels.

The composite signal derived from a swirl-type or vortex meter is applied to the trigger through an automatic gain control circuit in the form of a variable attenuator which acts automatically to decrease its attenuation as the dominant frequency of the applied signal increases, thereby effectively broadening the window for low operating frequencies within the operating range of the system to effect low-frequency noise rejection at high operating frequencies and effectively narrowing the window for low operating frequencies to effect high-frequency noise rejection at such low frequencies.

OUTLINE OF THE DRAWING

For a better understanding of the invention as well as other objects and further features thereof, reference is made to the following detailed description to be read in conjunction with the accompanying drawing, wherein:

FIG. 1 is a simplified block diagram of a signal conditioner in accordance with the invention, operating in conjunction with a Swirlmeter system;

FIG. 2 illustrates the operation of the trigger circuit included in the system;

FIGS. 3A, 3B and 3C are wave forms illustrating the effect of the automatic gain control circuit on the voltage applied to the trigger;

FIG. 4 shows the output wave form of the trigger for a dominant low-frequency input;

FIG. 5 shows the output wave form of the trigger for a dominant high-frequency input; and FIG. 6 is a schematic diagram of the signal conditioner.

DETAILED DESCRIPTION OF THE INVENTION

Referring now to FIG. 1, there is shown a Swirlmeter primary 10 utilizing the principle of vortex precession to develop a process-variable signal frequency that is directly related and proportional to flow velocity. Mounted on the body of meter 10 in the area where the vortex precession reaches the inner diameter of the meter wall is a sensor probe having a thermistor 11 in its top. Thermistor 11 is coupled to a detector-amplifier 12 mounted on the Swirlmeter primary. Detector-amplifier 12 incorporates frequency-compensation means to compensate for the frequency response of the thermistor. In practice, other forms of sensors may be used.

The signal conditioner, whose first stage is an automatic gain control (AGC) device 13, receives from detector-amplifier 12 a composite signal in an operating frequency range, which in practice, as indicated by curve 14, may extend between 10Hz and 1000Hz. In addition to the dominant or primary signal representing the flow variable of interest, the composite signal in the output of detector-amplifier 12, as represented by wave form 15, has a large noise content constituted by low and high frequency components other than the primary signal.

In practice, the A-C content of the composite signal may be in an amplitude range of 0.1 VPP (0.035 VRMS) to 5 VPP (1.8 VRMS). The task of the signal conditioner in accordance with the invention is to improve the signal-to-noise ratio of the incoming signal and to retransmit a 15 VPP square wave, representing the basic frequency, to a frequency meter 16 calibrated in terms of flow rate. By rejecting all frequencies other than the dominant frequency, the signal conditioner renders the system highly accurate.

Before describing the function of the elements constituting the signal conditioner and the manner in which they operate, we shall identify these elements. The output of the automatic gain control device 13, which is the input stage, is coupled through a tracking or sliding high-pass filter 17 to an amplifier 18 whose output is applied to a trigger 19, and is also fed back by way of a frequency-shaping circuit 20 to the AGC device 13. square-wave pulses produced by trigger 19 go to a driver output stage 21 and are also fed back to a one-shot circuit 22 whose pulses are applied through filter control network 23 to tracking high-pass filter 17.

The heart of the signal conditioner is trigger 19, whose function is to turn a noisy composite signal into a square wave representing the fundamental frequency. In practice, this circuit may be a Schmitt trigger provided with a predetermined trigger differential. As shown in FIG. 2, the trigger is designed to change its output state from state (−) to state (+) at a predetermined high voltage level $L_1$ and to revert back to its original state (−) at a somewhat lower voltage level $L_2$. The difference between levels $L_1$ and $L_2$ constitutes the trigger window W, within which no change in voltage in any way affects the trigger output.

Thus, with a composite signal CS having a dominant fundamental frequency and low and high frequency components, when the signal applied to the trigger exceeds level $L_1$ at intersection point X, its state switches from (−) to (+). No change in state occurs until the amplitude of signal CS drops to the intersection point Y in level $L_2$, at which point the trigger reverts to state (−) and remains in that state until the amplitude of signal CS again reaches level $L_1$. Thus the trigger generates a square wave whose periodicity corresponds to the dominant frequency of the signals.

The width of trigger window W is fixed. However, in order to improve low-frequency noise rejection at high operating frequencies, and high-frequency noise rejection at low operating frequencies, it becomes necessary to vary the apparent size of the trigger window so that with a low-frequency fundamental, the window appears to be broad, causing the trigger to discriminate against the high-frequency components imposed on the fundamental, whereas with a high-frequency fundamental, the window is narrowed to exclude the low-frequency components in the composite signal.

FIGS. 3A, 3B and 3C illustrate typical wave shapes in a noisy system where band-width is limited to a given operating range by roll-off filters at both ends of the band, as is accomplished in detector-amplifier 12 (FIG. 1). Thus, as shown in FIG. 3A, there is a roll-off below 10Hz, the lower end of the range, and above 1000Hz, the upper end thereof.

Low-frequency composite signals have a considerable high-frequency active band-width above the operating frequency in the range. There is, however, little low-frequency noise since the system is then operating near the low-frequency cut-off point of 10Hz. Hence, with an operating signal of 15Hz, most of the low-frequency noise is below the active band-width of the system.

Conversely, a high-frequency composite signal contains mainly low-frequency noise, since most of the active band width lies below it. Hence, with an operating signal of, say, 905 Hz, most of the high-frequency noise is above the active band width of the operating range which cuts off at 1000 Hz.

In order to vary the apparent width of window W, the amplitude of the composite signal applied to the trigger is automatically increased as a function of frequency by the gain control device 13, to be later described, so that at the low end of the operating range of the system, which, in the sample given by FIG. 3A, is 10 Hz, the amplitude of the signal is relatively low, whereas at the high end, which is 1000 Hz, the amplitude is high.

Thus a typical composite signal CS applied to the trigger, having a low-frequency fundamental, as shown in FIG. 3B, is of relatively low amplitude, and while the width of window W is fixed, the window, which in this instance is about 70 percent of the peak-to-peak amplitude dimension of the applied signal, appears large with respect to the composite signal and discriminates against the high-frequency noise components. Thus the square-wave trigger output, as shown in FIG. 4, corresponds to the low-frequency fundamental and disregards all other components in the composite signal.

However, a typical composite signal having a high-frequency fundamental frequency, as shown in FIG. 3c, is of relatively high amplitude. While the width of the trigger window W is still fixed, the window now is about 23 percent of the peak-to-peak amplitude dimension of the applied signal and hence appears narrow with respect thereto and discriminates against the low-frequency noise components. Thus, in this instance, the square-wave trigger output, as shown in FIG. 5, corresponds to the high-frequency fundamental and disregards all other components.

Returning now to FIG. 1, the manner in which the composite signal applied to trigger 19 is automatically varied in amplitude to produce apparent changes in window size will now be explained.

The composite signal of the Swirlmeter detector-amplifier 12 appears at point A and its wave form is represented by form 15. This signal enters the automatic gain control (AGC) stage 13 which functions to regulate the amplitude at point B, the input to the trigger 19. In practice the AGC is an attenuator circuit whose degree of attenuation is varied automatically to provide a signal of approximately 6VPP at a fundamental of 200 Hz and of approximately 10VPP at 1000 Hz, thereby raising the gain with increasing frequency.

The operation of the AGC circuit is controlled by frequency-shaping network 20, a low-pass filter preferably in the form of a simple R-C circuit consisting of one resistor and one capacitor coupled to point B. The output of the network 20 is applied at point C to AGC circuit 13. The filter output appearing at point C has the waveform shown at 24, and it will be seen that the gain is highest at the low-frequency end of the range and diminishes as frequency increases.

Since the resultant attenuation introduced by AGC circuit 13 depends on the control voltage applied thereto by the frequency-shaping network 20, the attenuation is greatest at the low-frequency end of the range. Consequently, at point B, the amplitude of the composite signal applied to the trigger is low for the low-frequency signal and high for the high-frequency signal.

Tracking high-pass filter 17 makes use of a single or multiple pole filter using variable resistance capacitance or inductive elements to shift the filter up or down in frequency, as indicated by graph 25, as a function of voltage applied thereto by filter control network 23. In practice, filter 17 may be constituted by a two-pole R-C filter using FET's as adjustable resistance elements. As the gate voltage in the FET's is raised, they lower their resistance and the operating point of the filter moves to a higher frequency, as indicated by the dashed lines in graph 25.

The output from tracking filter 17 at point D, represented by wave form 26, is amplified by filter amplifier 18, which is an operational amplifier whose gain-vs.-frequency characteristic is indicated by graph 27. It will be seen that the gain-vs.-frequency characteristics of the amplifier are set up to provide some degree of high-frequency roll-off.

The one-shot circuit 22 coupled to the output of trigger 19 at point E, produces a single pulse of constant height and width for each cycle of output frequency, irrespective of the operating frequency. In practice, one-shot 22 is a temperature-compensated device producing, at point F, a pulse of about 9V amplitude at 160 microseconds in width each time the positive-going edge of the square wave of the trigger output appears.

Filter control network 23 converts pulses from one-shot 22 into a D-C voltage varying as a function of frequency suitable for controlling the gates of the FET's acting as variable resistors in tracking filter 17, thereby closing the feedback loop in the tracking filter. While the trigger, in combination with the AGC, acts to remove a high degree of noise, tracking filter 17, in combination with amplifier 18, nevertheless has a beneficial effect, for it filters the signal fed to the trigger circuit to optimize the fundamental frequency and de-emphasize all other components, which is particularly useful with a very noisy signal.

Thus the wave form $28_i$ of the signal at point B, the input of trigger 19, is that of an a-c signal in which the operating frequency is predominant, whereas the wave form $28_o$ at point E, the trigger output, is a square-wave whose frequency corresponds to the dominant operating frequency.

Referring now to FIG. 6, the schematic circuit of a preferred embodiment of a signal conditioner in accordance with the invention is shown, the stages which correspond to the stages shown in FIG. 1 being identified by like reference numerals.

The input from detector-amplifier 12 (FIG. 1) is applied at input terminal A leading to the AGC circuit 13 wherein gain control is achieved by varying the d-c current through diode 30. As current increases, the voltage on the base of transistor 31 is raised to cause a drop in the resistance of the diode, thereby increasing attenuation. The frequency characteristics of the AGC circuit are determined by capacitor 32 and resistor 33 in the frequency-shaping network 20.

The output of the AGC circuit is applied to sliding high-pass filter 17 through a buffer-amplifier 34 including an emitter-follower 35 having unity gain to provide a low source impedance for the sliding filter. In the sliding high-pass filter 17, FET's 36 and 37 act as the adjustable resistance elements and as the gate voltage thereon, which is derived from filter control network 23, is raised, the FET's lower their resistance and the filter operating point moves to a higher frequency.

Filter amplifier 18 amplifies the output of sliding high-pass filter 17, the output of the amplifier at point B being fed back to resistor 33, the control input of the AGC circuit 13. The amplifier output is fed to trigger 19 through a zero-flow cut-off circuit 38 which includes a transistor 39.

The arrangement is such that when the output of filter amplifier 18 drops below a predetermined mean value, transistor 39 grounds the signal applied to the trigger. This arrests random noise at zero flow from entering the trigger. Trigger 19 is an inverter whose positive swing is clamped to a predetermined voltage level (i.e., 15 volts) by zener diode 40. The output of driver 16 is a positive-going 15-volt square-wave in relation to common.

One-shot 22 is a temperature-compensated device producing a pulse of constant height and duration (i.e., 9 volts - 160 microseconds) every time the positive-going edge of the input square-wave turns on a transistor 41. The filter control network 23 converts the pulses from the one-shot into a voltage used to control the gates of FET's 36 and 37 in the sliding high-pass filter 17.

While there have been shown and described several embodiments of signal conditioner for recovering dominant signals from swirl-type meters in accordance with the invention, it will be understood that many changes and modifications may be made therein without, however, departing from the essential spirit of the invention.

I claim:

1. A signal conditioner adapted to extract the dominant frequency from the composite output signal of a swirl or vortex type flowmeter and to exclude low and high frequency noise components therefrom so that by measuring the dominant frequency, an accurate reading is obtained of flow rate, said conditioner comprising:

A. a square-wave-generating trigger having a differential characteristic wherein a change in output state takes place when the amplitude of the signal applied thereto exceeds a predetermined high level, the trigger reverting to its original state when the amplitude of said signal falls below a predetermined lower level, no change in state occurring with respect to amplitude fluctuations lying within the fixed window defined by the two levels, B. a voltage-responsive variable attenuator adapted to produce attenuation to a degree determined by an applied control voltage, C. means including an amplifier to apply the composite signal from the flowmeter through the variable attenuator and said amplifier to the input of the trigger, and D. wave-shaping means coupled to the output of said amplifier to produce a control voltage whose amplitude is a function of frequency and to apply said control voltage to said attenuator to cause the amplitude of said composite signal applied to said trigger to increase as the frequency thereof increases in order to vary the apparent width of the fixed window, thereby effectively broadening the window for low frequencies and narrowing the window for high frequencies to effect low-frequency noise rejection at high operating frequencies and high-frequency noise rejection at low operating frequencies.

2. A conditioner as set forth in claim 1, further including a driver stage coupled to the output of said trigger to produce square-wave pulses of constant height and width for application to a frequency meter providing a reading of flow rate.

3. A conditioner as set forth in claim 1, further including a tracking high-pass filter interposed between said attenuator and said amplifier to optimize the amplitude of the dominant frequency in said composite signal.

4. A conditioner as set forth in claim 3, further including a one-shot circuit coupled to the output of said trigger to produce a pulse for every cycle of output frequency irrespective of the operating frequency, and a filter control network coupled to said one-shot circuit and responsive to pulses produced thereby to produce a voltage whose amplitude is a function of the rate of said pulses for controlling said tracking filter.

5. A conditioner as set forth in claim 3, further including a buffer amplifier interposed between said attenuator and said tracking filter.

6. A conditioner as set forth in claim 1, wherein said attenuator includes a diode whose resistance is varied to effect a varying degree of attenuation.

7. A conditioner as set forth in claim 1, further including a zero flow cut-off circuit interoised between said amplifier and said trigger circuit, said zero flow cut-off circuit grounding the output of said amplifier when the flow rate is substantially at zero level and thereby preventing random noise from entering said trigger circuit.

8. A conditioner as set forth in claim 1, wherein said trigger is a Schmitt circuit.

* * * * *

UNITED STATES PATENT OFFICE
CERTIFICATE OF CORRECTION

Patent No. 3,709,034  Dated January 9, 1973

Inventor(s) PETER J. HERZL

It is certified that error appears in the above-identified patent and that said Letters Patent are hereby corrected as shown below:

Column 7
    Line 11 should have read:

--tering the trigger. Trigger 19 is an amplifier
    with positive feedback. The output driver 21 --

Signed and sealed this 22nd day of May 1973.

(SEAL)
Attest:

EDWARD M. FLETCHER, JR.
Attesting Officer

ROBERT GOTTSCHALK
Commissioner of Patents